(12) United States Patent
Krieger et al.

(10) Patent No.: US 6,475,632 B1
(45) Date of Patent: Nov. 5, 2002

(54) DISPERSIONS FOR PRODUCING PAINT FOR CONCRETE ROOF TILES, PAINT FOR CONCRETE ROOF TILES AND CONCRETE ROOF TILES COATED WITH SUCH PAINT

(75) Inventors: Stephan Krieger, Hofheim; Klaus Zimmerschied, Wiesbaden; Erhard Lupprich, Frankfurt, all of (DE)

(73) Assignee: Clariant GmbH, Frankfurt (GB)

( * ) Notice: Subject to any disclaimer, the term of this patent is extended or adjusted under 35 U.S.C. 154(b) by 0 days.

(21) Appl. No.: 09/646,236
(22) PCT Filed: Mar. 17, 1999
(86) PCT No.: PCT/EP99/01746

§ 371 (c)(1),
(2), (4) Date: Sep. 11, 2000

(87) PCT Pub. No.: WO99/48841

PCT Pub. Date: Sep. 30, 1999

(30) Foreign Application Priority Data

Mar. 20, 1998 (DE) ............................................ 19812143

(51) Int. Cl.$^7$ ................................................. B32B 27/00
(52) U.S. Cl. ...................... 428/500; 428/507; 428/505; 525/328.5; 524/457; 524/460
(58) Field of Search ................................. 428/500, 507, 428/509; 525/326.5; 524/457, 460

(56) References Cited

U.S. PATENT DOCUMENTS 5,047,295 A 9/1991 Dotzauer et al. ............ 428/500
5,215,827 A 6/1993 Dotzauer et al. ............ 428/500
5,635,566 A 6/1997 Gerharz et al. .............. 525/291

FOREIGN PATENT DOCUMENTS

| DE | 124808 | 3/1977 |
| EP | 0 383 002 | 8/1990 |
| EP | 0 469 295 | 2/1992 |
| EP | 0 492 210 | 7/1992 |
| EP | 0 630 920 | 12/1994 |
| EP | 0 694 557 | 1/1996 |
| EP | 0 773 245 | 5/1997 |
| JP | 4025502 | 1/1992 |
| WO | WO 92/00335 | * 1/1992 |

OTHER PUBLICATIONS

English abstract of JP 4025502, Jan. 29, 1992.
PCT Search Report.
Derwent Patent Family Abstract for EP 0 694 577.
Derwent Patent Family Abstract for EP 0 773 245.
Derwent Patent Family Abstract for EP 0 469 295.
Derwent Patent Family Abstract for DD 124808.
Derwent Patent Family Abstract for EP 0 630 920.
Derwent Patent Family Abstract for JP 61 174 279, XP–002108591.

* cited by examiner

Primary Examiner—Leszek Kiliman
(74) Attorney, Agent, or Firm—Anthony A. Bisulca

(57) ABSTRACT

The present invention provides copolymer-based compositions which are used to produce point for roof tiles, in order to prevent algal vegetation, crack formation, increased water absorption, as well as chipping off of the paint, more particularly on concrete roof tiles.

15 Claims, No Drawings

DISPERSIONS FOR PRODUCING PAINT FOR CONCRETE ROOF TILES, PAINT FOR CONCRETE ROOF TILES AND CONCRETE ROOF TILES COATED WITH SUCH PAINT

The present invention relates to dispersions for preparing roof tile paints, to roof tile paints, and to roof tiles coated with roof tile paints.

In the course of the production of concrete roof tiles, a mortar mass is shaped and then generally colored, usually prior to curing, by coating with an emulsion paint (i.e., in the form of a dispersion). Subsequent curing then takes place together with the drying of the paint at temperatures of from 40 to 100° C. After curing, there may be a second coating with an emulsion paint or with a clearcoat, and subsequent drying.

In order that the paint does not coagulate on the uncured concrete, which is referred to as green concrete, the binder is required to possess a certain degree of stability, e.g. cement compatibility and heightened salt stability. This is generally achieved through the use of ionic and/or nonionic emulsifiers, and also by using functional monomers, such as methacrylic acid, acrylic acid, maleic acid, acrylamide, methacrylamide, ethenesulfonate and/or sulfoxyethyl methacrylate, for example. In addition to coloring, the emulsion paint has the function of preventing lime efflorescence as the concrete roof tiles cure. Another function is to prevent or reduce soil pickup, and in particular the growth of algae, on the finished roof tiles.

The use of dispersions based on (meth)acrylic esters and/or styrene for preparing roof tile paints is already known from DD 124808. EP-A-0 492 210 describes the use of certain monomers for reducing the soil pickup tendency of the concrete roof tile. For the purpose of reducing lime efflorescence, EP-A-0 469 295 claims the use of emulsifiers based on sulfonated diaryl ethers.

For the purpose of stabilization, the dispersions include hydrophilic constituents, such as emulsifiers and functional monomers such as methacrylic acid, acrylic acid, maleic acid, acrylamide, methacrylamide, ethenesulfonate or sulfoxyethyl methacrylate, for example. Owing to the hydrophobic constituents, the corresponding paint films exhibit heightened water absorption, which may lead to increased algal growth on the concrete roof tiles and, under conditions of freeze/thaw cycling, to cracking and flaking of the paint owing to the water absorbed.

For the purpose of preventing algal growth, DE-A-39 01 073 describes the use of copolymerizable tin compounds. Like the subsequent addition of algicides, however, this is ecologically objectionable.

It has now surprisingly been found that, by using carboxymethylcellulose as protective colloid, it is possible to prepare dispersions which, as binders in roof tile paints, exhibit sufficient cement stability but low water absorption in the paint film, leading to reduced algal growth, improved freeze/thaw stability of the coating, and enhanced protection against efflorescence.

The present invention provides for the use, for preparing roof tile paints, of a dispersion prepared using from 0.1 to 3, preferably from 0.1 to 1.5, percent by weight (based on the total monomer content) of carboxymethylcellulose as protective colloid, in connection with which a monomer composition comprising a) from 85 to 99.8% by weight of acrylic esters with $C_1$ to $C_{12}$ alkanols, methacrylic esters with $C_1$ to $C_{12}$ alkanols and/or vinylaromatic monomers, b) from 0.2 to 5% by weight of copolymerizable carboxylic acids, carboxamides, sulfates and/or sulfonates, and c) from 0 to 10% by weight of other monomers is polymerized in the form of an aqueous emulsion.

The carboxymethylcellulose used preferably comprises water-soluble carboxymethylcelluloses having a degree of substitution of from 0.4 to 2.9, with particular preference from 0.4 to 1.5, and in particular from 0.6 to 1.4, the degree of substitution referring to the average number of carboxymethyl groups introduced per anhydroglucose unit. It is preferred to use carboxymethylcelluloses whose 2% strength aqueous solutions possess a Brookfield viscosity (20 rpm) at 25° C. of less than 2000 (with spindle 3), with particular preference less than 500 (with spindle 2), and in particular less than 100 (with spindle 1) mPas. The carboxymethylcellulose is used preferably in the form of its ammonium salt or alkali metal salt. Examples of suitable commercial products are Blanose 7M®, Blanose 7UL®, Blanose 7EL® and Ambergum 3021® from Aqualon. The carboxymethylcelluloses of the invention may also comprise further constituents, especially alkyl or hydroxyalkyl radicals having 1 to 4 carbon atoms, alkyloxyalkyl radicals having 2 to 6 carbon atoms, or dialkylamino radicals having a total of 2 to 6 carbon atoms. Examples of suitable compounds are methylcarboxymethylcellulose, ethylcarboxymethylcellulose, hydroxyethylcarboxymethylcellulose, hydroxypropylcarboxymethylcellulose, methoxyethylcarboxymethylcellulose, ethoxyethylcarboxymethylcellulose and diethylaminocarboxymethylcellulose.

Monomers a) used comprise acrylic and methacrylic esters of $C_1$ to $C_{12}$ monoalcohols, such as ethyl acrylate, butyl acrylate, n-octyl acrylate, 2-ethylhexyl acrylate, methyl methacrylate, butyl methacrylate, cyclohexyl methacrylate and isobornyl methacrylate, and/or vinylaromatic monomers such as styrene or vinyltoluene, for example. Use is made of those combinations, known to the skilled worker, of softening monomers, such as butyl acrylate and 2-ethylhexyl acrylate, for example, with hardening monomers, such as methyl methacrylate and styrene, for example, so that the glass transition temperature of the corresponding copolymer is situated preferably in the range from −10 to 60° C., with particular preference in the range from −5 to 50° C., and in particular in the range from 0 to 40° C.

If operating by the technique of multistage emulsion polymerization, the hardening and softening monomers and the ratio of the phases should preferably be combined such that the dispersion possesses a minimum film-forming temperature in the range from 0 to 50° C. and the corresponding dispersion films possess an elongation at break of more than 150% for a film thickness of 100 $\mu$m.

As far as copolymerizable carboxylic acids, carboxamides, sulfates and/or sulfonates b) are concerned, preference is given to the use of acrylic acid, methacrylic acid, itaconic acid, acrylamide, methacrylamide, sulfoalkyl (meth)acrylates, such as the potassium salt of sulfopropyl methacrylate (=SPM from Roschig) and/or sulfoalkyl(meth) acrylamides, such as the sodium salt of acrylamido-2-methylpropanesulfonic acid (=AMPS from Lubrizol), for example.

Monomers which may be used as said other monomers c) are monomers containing keto groups, such as monomers containing acetoacetoxy groups, for example, examples being acetoacetoxyethyl methacrylate, acetoacetoxybutyl methacrylate, acrylamidomethylacetylacetone and vinyl acetoacetate, and polymerizable derivatives of diacetone, such as diacetoneacrylamide and diacetonemethacrylamide.

Further compounds which may be used as monomers c) are hydroxyalkyl(meth)acrylates, glycidyl(meth)acrylates, alkoxyvinylsilanes, (meth)acryloyloxyalkylsilanes, (meth)acryloyloxyalkyl phosphates, and polymerizable ethyleneurea derivatives, such as N-(β-(meth)acryloxyethyl)-N,N'-ethyleneurea and N-(β-acrylamidoethyl)-N,N'-ethyleneurea, for example.

In order to improve the soil pickup behavior, dispersions whose other monomers c) include monomers containing keto groups may be admixed with polyfunctional carbohydrazides containing at least two hydrazide groups, such as adipohydrazide, oxalohydrazide, isophthalohydrazide and polyacrylopolyhydrazide, for example. It is preferred to use an equimolar ratio of hydrazide groups to keto groups.

The polymerization is conducted in accordance with the common techniques of emulsion polymerization, in which the monomers are emulsified in the aqueous phase in the presence of emulsifiers, initiators and the protective colloid and are polymerized at temperatures from 60 to 95° C. The emulsion polymerization may be conducted in accordance with the common techniques, known to the skilled worker, such as batch, monomer metering or emulsion feed techniques. It is preferred to operate in accordance with the emulsion feed technique, in which a small amount of the monomers is prepolymerized and then the remaining amount of monomers is metered in as an aqueous emulsion. If desired, two or more different monomer emulsions may also be metered in successively. Like the emulsifier, the protective colloid may be included in part in the initial charge to the reactor and/or metered in together with the monomer emulsion.

An essential feature is that the polymerization is conducted at pH >3, preferably >5, with particular preference in the pH range from 5 to 8. For this purpose, the monomer emulsion, comprising the protective colloid and also the copolymerizable carboxylic acids, carboxamides, sulfates and/or sulfonates b), and/or the initial reactor charge, are/is adjusted using an aqueous ammonia, alkali metal and/or alkaline earth metal hydroxide solution to a pH >3, preferably >5, with particular preference to a pH in the range from 5 to 8. An alternative option is to use an appropriate buffer.

The preparation of high-quality dispersions in accordance with the present invention presupposes the application of the existing experiences in the field of emulsion polymerization, even where they are not described here. Failure to (properly) observe the rules known to the skilled emulsion polymerization worker may therefore adversely affect important properties, an example being the water resistance of the dispersion films. Based on the polymer content, therefore, the dispersions should not substantially exceed the commonly used amounts of up to 3% by weight, preferably up to 2% by weight, of ionic emulsifiers, and, respectively, up to 6% by weight, preferably up to 4% by weight, of nonionic emulsifiers.

Particular preference is given to the use of ionic emulsifiers only, in an amount of <2% by weight.

Examples of nonionic emulsifiers which may be used are alkyl polyglycol ethers such as ethoxylation products of lauryl, oleyl or stearyl alcohol or of mixtures such as coconut fatty alcohol; alkylphenol polyglycol ethers such as ethoxylation products of octylphenol or nonylphenol, diisopropylphenol, triisopropylphenol or of di- or tri-tert-butylphenol; or ethoxylation products of polypropylene oxide.

Suitable ionic emulsifiers are primarily anionic emulsifiers. These may comprise the alkali metal salts or ammonium salts of alkyl-, aryl- or alkylaryl-sulfonates or -phosphonates, alkyl, aryl or alkylaryl sulfates or phosphates, or compounds with other anionic end groups, the presence of oligoethylene oxide or polyethylene oxide units between the hydrocarbon radical and the anionic group also being possible. Typical examples are sodium lauryl sulfate, sodium undecyl glycol ether sulfate, sodium lauryl diglycol sulfate, sodium tetradecyl triglycol sulfate, sodium octylphenol glycol ether sulfate, sodium dodecylbenzenesulfonate, ammonium tri-tert-butylphenol pentaglycol or octaglycol sulfate.

To start and continue the polymerization, use is made of oil-soluble and/or preferably water-soluble free-radical initiators or redox systems. Suitable compounds include, for example, hydrogen peroxide, potassium, sodium or ammonium peroxodisulfate, dibenzoyl peroxide, lauryl peroxide, tri-tert-butyl peroxide, bisazodiisobutyronitrile, alone or together with reducing components, examples being sodium bisulfite, Rongalit, glucose, ascorbic acid, and other compounds possessing reductive activity. Preference is given to the use of peroxodisulfates.

It is also possible to use regulators, such as mercaptans, especially n-dodecylmercaptan, thiophenol and/or 2-methyl-5-tert-butylthiophenol. Usually, amounts of from 0 to 1% by weight, preferably from 0 to 0.5% by weight, are used, and with particular preference the dispersion is prepared without using a regulator.

The dispersions are usually adjusted to a pH of from 6.5 to 10, preferably from 7.0 to 9.0, using aqueous ammonia, alkali metal and alkaline earth metal hydroxide solutions.

If desired, the dispersion may further comprise film-forming auxiliaries, such as white spirit, Texanol®, butyl diglycol and butyl dipropylene glycol, plasticizers, such as dimethyl phthalate and dibutyl phthalate, dispersants such as polyacrylic acids and corresponding copolymers, such as Lopon 890®, Dispex G40®, thickeners based on polyacrylates or polyurethanes such as Borchigel L75® and Tafigel PUR 40®, preservatives, defoamers, such as mineral oil or silicone defoamers, for example, wetting agents, such as aminomethylpropanol, and other additives customary in the formulation of coating compositions.

The dispersion is suitable for coating roof tiles, preferably green roof tiles. Suitable coating compositions are prepared in a known manner by incorporating inorganic fillers and color pigments into the dispersion, it being possible to establish the desired viscosity of the paint by adding water and/or by using thickeners. Examples of suitable inorganic fillers include calcite, chalk, quartz flour and/or heavy spar. Suitable pigments include inorganic pigments such as red iron oxide, for example, and black pigments, and also organic pigments.

The present invention is described in more detail below with reference to working examples, though without being restricted thereby.

EXAMPLE 1

First of all, a monomer emulsion is prepared. This is done by adjusting a mixture of 507.0 pbw of water,
  12.1 pbw of Ambergum 3021 ®,
  39.3 pbw of a 38% strength solution of a $C_{12}$ to $C_{14}$ alkyl polyglycol ether sulfate containing approximately 3 ethylene oxide units, and
  11.0 pbw of methacrylic acid to a pH of 8 using a 12.5% strength ammonia solution, incorporating

| | |
|---|---|
| 572.0 pbw | of methyl methacrylate, |
| 528.0 pbw | of butyl acrylate, and |
| 2.75 pbw | of ammonium peroxodisulfate | by stirring with a high-speed stirrer, and continuing stirring until a stable emulsion is formed. Then, in an appropriate reaction vessel,

| | |
|---|---|
| 522.5 pbw | of water, |
| 8.65 pbw | of Ambergum 3021 ®, |
| 2.0 pbw | of a 38% strength solution of a $C_{12}$ to $C_{14}$ alkyl polyglycol ether sulfate containing approximately 3 ethylene oxide units, and |
| 66.0 pbw | of the monomer emulsion | are heated to 80° C. and admixed with a solution of 0.55 pbw of ammonium peroxodisulfate in 15 pbw of water. Subsequently, the remaining monomer emulsion is metered in over the course of 3.5 hours. Heating is continued for 60 minutes, and then the mixture is cooled. The pH is adjusted to 9.0 using a 12.5% strength ammonia solution. The solids content of the dispersion is 48.8% by weight and the MFT is 12° C.

EXAMPLE 2

First of all, a monomer emulsion is prepared. This is done by adjusting a mixture of

| | |
|---|---|
| 508.2 pbw | of water, |
| 17.3 pbw | of Ambergum 3021 ®, |
| 39.3 pbw | of a 38% strength solution of a $C_{11}$ alkyl polyglycol ether sulfate containing approximately 7 ethylene oxide units, |
| 11.0 pbw | of methacrylic acid and |
| 5.5 pbw | of acrylic acid | to a pH of 8 using a 12.5% strength ammonia solution, incorporating

| | |
|---|---|
| 572.0 pbw | of methyl methacrylate, |
| 528.0 pbw | of butyl acrylate, and |
| 2.75 pbw | of ammonium peroxodisulfate | by stirring with a high-speed stirrer, and continuing stirring until a stable emulsion is formed. Then, in an appropriate reaction vessel,

| | |
|---|---|
| 522.5 pbw | of water, |
| 12.0 pbw | of Ambergum 3021 ®, |
| 4.0 pbw | of a 38% strength solution of a $C_{11}$ alkyl polyglycol ether sulfate containing approximately 7 ethylene oxide units, and |
| 66.0 pbw | of the monomer emulsion | are heated to 80° C. and admixed with a solution of 0.55 pbw of ammonium peroxodisulfate in 15 pbw of water. Subsequently, the remaining monomer emulsion is metered in over the course of 3.5 hours. Heating is continued for 60 minutes, and then the mixture is cooled. The pH is adjusted to 9.0 using a 12.5% strength ammonia solution. The solids content of the dispersion is 49.5% by weight and the MFT is 9° C.

EXAMPLE 3

First of all, a monomer emulsion is prepared. This is done by adjusting a mixture of

| | |
|---|---|
| 517.65 pbw | of water, |
| 2.75 pbw | of Blanose 7 ULC ®, |
| 39.3 pbw | of a 38% strength solution of a $C_{12}$ to $C_{14}$ alkyl polyglycol ether sulfate containing approximately 3 ethylene oxide units, and |
| 11.0 pbw | of methacrylic acid | to a pH of 8 using a 12.5% strength ammonia solution, incorporating

| | |
|---|---|
| 572.0 pbw | of methyl methacrylate, |
| 525.0 pbw | of butyl acrylate, and |
| 2.75 pbw | of ammonium peroxodisulfate | by stirring with a high-speed stirrer, and continuing stirring until a stable emulsion is formed. Then, in an appropriate reaction vessel, 522.5 pbw of water,
  1.1 pbw of Blanose 7 ULC ®,
  4.0 pbw of a 38% strength solution of a $C_{12}$ to $C_{14}$ alkyl polyglycol ether sulfate containing approximately 3 ethylene oxide units, and
66.0 pbw of the monomer emulsion are heated to 80° C. and admixed with a solution of 0.55 pbw of ammonium peroxodisulfate in 15 pbw of water. Subsequently, the remaining monomer emulsion is metered in over the course of 3.5 hours. Heating is continued for 60 minutes, and then the mixture is cooled. The pH is adjusted to 9.0 using a 12.5% strength ammonia solution. The solids content of the dispersion is 49.9% by weight and the MFT is 10° C.

EXAMPLE 4

First of all, a monomer emulsion is prepared. This is done by adjusting a mixture of 520.3 pbw of water,
  5.5 pbw of Blanose 7 ULC ®,
39.3 pbw of a 38% strength solution of a $C_{12}$ to $C_{14}$ alkyl polyglycol ether sulfate containing approximately 3 ethylene oxide units, and
11.0 pbw of methacrylic acid to a pH of 8 using a 12.5% strength ammonia solution, incorporating

| | |
|---|---|
| 572.0 pbw | of methyl methacrylate, |
| 528.0 pbw | of butyl acrylate, and |
| 2.75 pbw | of ammonium peroxodisulfate | by stirring with a high-speed stirrer, and continuing stirring until a stable emulsion is formed. Then, in an appropriate reaction vessel,

| | |
|---|---|
| 522.50 pbw | of water, |
| 1.1 pbw | of Blanose 7 ULC ®, |
| 4.0 pbw | of a 38% strength solution of a $C_{12}$ to $C_{14}$ alkyl polyglycol ether sulfate containing approximately 3 ethylene oxide units, and |
| 66.0 pbw | of the monomer emulsion | are heated to 80° C. and admixed with a solution of 0.55 pbw of ammonium peroxodisulfate in 15 pbw of water. Subsequently, the remaining monomer emulsion is metered in over the course of 3.5 hours. Heating is continued for 60 minutes, and then the mixture is cooled. The pH is adjusted to 9.0 using a 12.5% strength ammonia solution. The solids content of the dispersion is 49.9% by weight and the MFT is 13° C.

Comparative Example 5

First of all, a monomer emulsion is prepared. This is done by preparing a mixture of

| | |
|---|---|
| 512.7 pbw | of water, |
| 39.3 pbw | of a 35% strength solution of a $C_{12}$ to $C_{14}$ alkyl polyglycol ether sulfate containing approximately 3 ethylene oxide units, and |
| 11.0 pbw | of methacrylic acid, |
| incorporating | |
| 572.0 pbw | of methyl methacrylate, |
| 528.0 pbw | of butyl acrylate, and |
| 2.75 pbw | of ammonium peroxodisulfate | by stirring with a high-speed stirrer, and continuing stirring until a stable emulsion is formed. Then, in an appropriate reaction vessel,

| | |
|---|---|
| 522.5 pbw of water, | |
| 4.0 pbw | of a 38% strength solution of a $C_{12}$ to $C_{14}$ alkyl polyglycol ether sulfate containing approximately 3 ethylene oxide units, and |
| 66.0 pbw of the monomer emulsion | | are heated to 80° C. and admixed with a solution of 0.55 pbw of ammonium peroxodisulfate in 15 pbw of water. Subsequently, the remaining monomer emulsion is metered in over the course of 3.5 hours. Heating is continued for 60 minutes, and then the mixture is cooled. The pH is adjusted to 9.0 using a 12.5% strength ammonia solution. The solids content of the dispersion is 49.2% by weight and the MFT is 12° C.

Comparative Example 6

First of all, a monomer emulsion is prepared. This is done by preparing a mixture of

| | |
|---|---|
| 515.7 pbw | of water, |
| 19.7 pbw | of a 35% strength solution of a $C_{12}$ to $C_{14}$ alkyl polyglycol ether sulfate containing approximately 3 ethylene oxide units, and |
| 11.0 pbw | of methacrylic acid, |
| incorporating | |
| 572.0 pbw | of methyl methacrylate, |
| 528.0 pbw | of butyl acrylate, and |
| 2.75 pbw of ammonium peroxodisulfate | | by stirring with a high-speed stirrer, and continuing stirring until a stable emulsion is formed. Then, in an appropriate reaction vessel,

| | |
|---|---|
| 522.5 pbw of water, | |
| 19.7 pbw | of a 38% strength solution of a $C_{12}$ to $C_{14}$ alkyl polyglycol ether sulfate containing approximately 3 ethylene oxide units, and |
| 66.0 pbw of the monomer emulsion | | are heated to 80° C. and admixed with a solution of 0.55 pbw of ammonium peroxodisulfate in 15 pbw of water. Subsequently, the remaining monomer emulsion is metered in over the course of 3.5 hours. Heating is continued for 60 minutes, and then the mixture is cooled. The pH is adjusted to 9.0 using a 12.5% strength ammonia solution. The solids content of the dispersion is 50.4% by weight and the MFT is 10° C.

EXAMPLE 7

In order to examine the compatibility with respect to cement, 10% by weight of cement, based on the dispersion, is incorporated by stirring into each of the dispersions of Examples 1 to 4 and of Comparative Examples 5 and 6, and an assessment is made of whether the dispersion remains stable or coagulates over the course of 8 hours.

| Dispersion | Cement compatibility finding |
|---|---|
| Dispersion of Example 1 | Dispersion is stable |
| Dispersion of Example 2 | Dispersion is stable |
| Dispersion of Example 3 | Dispersion is stable |
| Dispersion of Example 4 | Dispersion is stable |
| Dispersion of Comparative Example 5 | Dispersion coagulates |
| Dispersion of Comparative Example 6 | Dispersion coagulates |

EXAMPLE 8

A roof tile paint paste is prepared by successive stirred incorporation into

| | |
|---|---|
| 600 pbw of | of water |
| 1200 pbw | of calcite filler and |
| 300 pbw | of red iron oxide pigment. |

In order to prepare a roof tile paint, a mixture of

| | |
|---|---|
| 120.0 pbw | of the dispersion of Examples 1 to 6, |
| 3.8 pbw | of butyl diglycol, and |
| 1.0 pbw | of silicone defoamer | is added to 87.5 pbw of each paste, paint preparation being preceded by the stirred incorporation, into the dispersion of Example 1, of an additional 0.6 pbw of a neutralized polyacrylic acid (Lopon 890®) as dispersant.

The cement compatibility and water absorption of the paints are determined, as is the spotting on fiber cement slabs on exposure to moisture under hot conditions, in order to simulate the efflorescence behavior.

| Paint based on dispersion of Example: | Cement compatibility of the paint with addition of 10% cement [1] | Water absorption of the paint in % [2] | Spotting [3] |
|---|---|---|---|
| 1 with addition of 0.6 pbw of Lopon 890 ® | stable | 7 | minimal |
| 2 | stable | 12 | none |
| 3 | stable | 6 | minimal |
| 4 | stable | 6 | minimal |
| Comparative Example 5 | paint coagulates | 7 | severe |
| Comparative Example 6 | paint coagulates | 6 | severe |

[1] 10% cement are stirred into the roof tile paint and then stability of the paint is assessed.
[2] A 400 μm thick paint film is applied by knife coating and dried overnight in a drying cabinet at 50° C. The water absorption on 24-hour storage in water is then determined by differential weighing.
[3] The efflorescence behavior is tested by knife-coating a 400 μm thick paint film onto a fiber cement slab, drying the paint film overnight at 50° C. and then placing the slab for one week with the coated side over a waterbath at 60° C. The paint film is subsequently assessed for spotting.

What is claimed is:

1. A roof tile paint comprising:
   at least one color pigment; and
   a dispersion prepared using from 0.1 to 3 percent by weight (based on the total monomer content) of carboxymethylcellulose as a protective colloid emulsion polymerized in connection with a monomer composition including:
   a) from 85 to 99.8% by weight of acrylic esters with $C_1$ to $C_{12}$ alkanols, methacrylic esters with $C_1$ to $C_{12}$ alkanols and/or vinylaromatic monomers, and
   b) from 0.2 to 5% by weight of copolymerizable carboxylic acids, carboxamides, sulfates and/or sulfonates.

2. The roof tile paint as claimed in claim 1, wherein the emulsion polymerization is conducted at a pH >3.

3. The roof tile paint as claimed in claim 1 or 2, wherein a water-soluble carboxymethylcellulose having a degree of substitution of from 0.4 to 2.9 is used as said protective colloid.

4. The roof tile paint as claimed in at least one of the preceding claims, wherein said protective colloid is a water-soluble carboxymethylcellulose whose 2% strength aqueous solutions possess a Brookfield viscosity at 25° C. and 20 rpm of less than 2000 (with spindle 3).

5. The roof tile paint as claimed in at least one of the preceding claims, wherein the emulsion polymerization is conducted using less than 1% by weight of a regulator.

6. The roof tile paint as claimed in at least one of the preceding claims, wherein the dispersion comprises from 0.1 to 2% by weight of a dispersant.

7. A roof tile composite comprising:
   a roof tile; and
   a paint composition coated on at least one surface of said roof tile said paint composition including
   at least one color pigment; and
   a dispersion prepared using from 0.1 to 3 percent by weight (based on the total monomer content) of carboxymethylcellulose as a protective colloid emulsion polymerized in connection with a monomer composition including:
   a) from 85 to 99.8% by weight of acrylic esters with $C_1$ to $C_{12}$ alkanols, methacrylic esters with $C_1$ to $C_{12}$ alkanols and/or vinylaromatic monomers, and
   b) from 0.2 to 5% by weight of copolymerizable carboxylic acids, carboxamides, sulfates and/or sulfonates.

8. The roof tile paint as claimed in claim 1, wherein 0.1 to 1.5 percent by weight based on the total monomer content of said carboxymethylcellulose is used.

9. The roof tile paint as claimed in claim 1, wherein said emulsion polymerization is in the form of an aqueous emulsion.

10. The roof tile composite as claimed in claim 7, wherein said emulsion polymerization is in the form of an aqueous emulsion.

11. The roof tile composite of claim 7, wherein said roof tile is concrete.

12. The roof tile composite of claim 7, wherein said emulsion polymerization is conducted at a pH >3.

13. A method for making a roof tile paint comprising the step of adding a binder to a paint composition, wherein said binder includes
   carboxymethylcellulose as a protective colloid and is emulsion polymerized with a monomer composition comprising
   a) from 85 to 99.8% by weight of acrylic esters with $C_1$ to $C_{12}$ alkanols, methacrylic esters with $C_1$ to $C_{12}$ alkanols and/or vinylaromatic monomers, and
   b) from 0.2 to 5% by weight of copolymerizable carboxylic acids, carboxamides, sulfates and/or sulfonates.

14. The method as claimed in claim 11, wherein said emulsion polymerization is conducted at a pH >3.

15. A dispersion comprising 0.1 to 3, percent by weight (based on the total monomer content) of carboxymethylcellulose as a protective colloid, emulsion polymerized with a monomer composition comprising:
   a) from 85 to 99.8% by weight of acrylic esters with $C_1$ to $C_{12}$ alkanols, methacrylic esters with $C_1$ to $C_{12}$ alkanols and/or vinylaromatic monomers, and
   b) from 0.2 to 5% by weight of copolymerizable carboxylic acids, carboxamides, sulfates and/or sulfonates, wherein said emulsion polymerization is conducted at a pH >3.

* * * * *